United States Patent [19]

Ciampa et al.

[11] Patent Number: 5,005,900
[45] Date of Patent: Apr. 9, 1991

[54] AUTOMOTIVE SEAT CUSHION SUPPORT

[75] Inventors: Jerry D. Ciampa, Dearborn Heights; Lawrence J. Kummer, Plymouth, both of Mich.

[73] Assignee: Ford Motor Company, Dearborn, Mich.

[21] Appl. No.: 364,765

[22] Filed: Jun. 12, 1989

[51] Int. Cl.⁵ ............................................. A47C 7/02
[52] U.S. Cl. ................................... 297/216; 297/458
[58] Field of Search .............. 296/68.1; 297/216, 458, 297/459, 452, DIG. 1

[56] References Cited

U.S. PATENT DOCUMENTS

| 2,411,412 | 11/1946 | Blair et al. | 297/458 X |
| 3,363,943 | 1/1968 | Getz et al. | 296/458 |
| 4,606,532 | 8/1986 | Kazaoka et al. | 297/458 X |
| 4,753,479 | 1/1988 | Hatsutta | 297/458 |

Primary Examiner—José V. Chen
Attorney, Agent, or Firm—Daniel M. Stock; Roger L. May

[57] ABSTRACT

An automotive vehicle seat is provided with a support frame positioned beneath the seating position of a vehicle occupant which includes an inclined restraining portion for resisting the tendency of a seated occupant to be displaced forwardly and downwardly upon imposition of deceleration forces when the vehicle is moving in a forward direction.

14 Claims, 3 Drawing Sheets

Fig-1

U.S. Patent        Apr. 9, 1991        Sheet 1 of 3        5,005,900
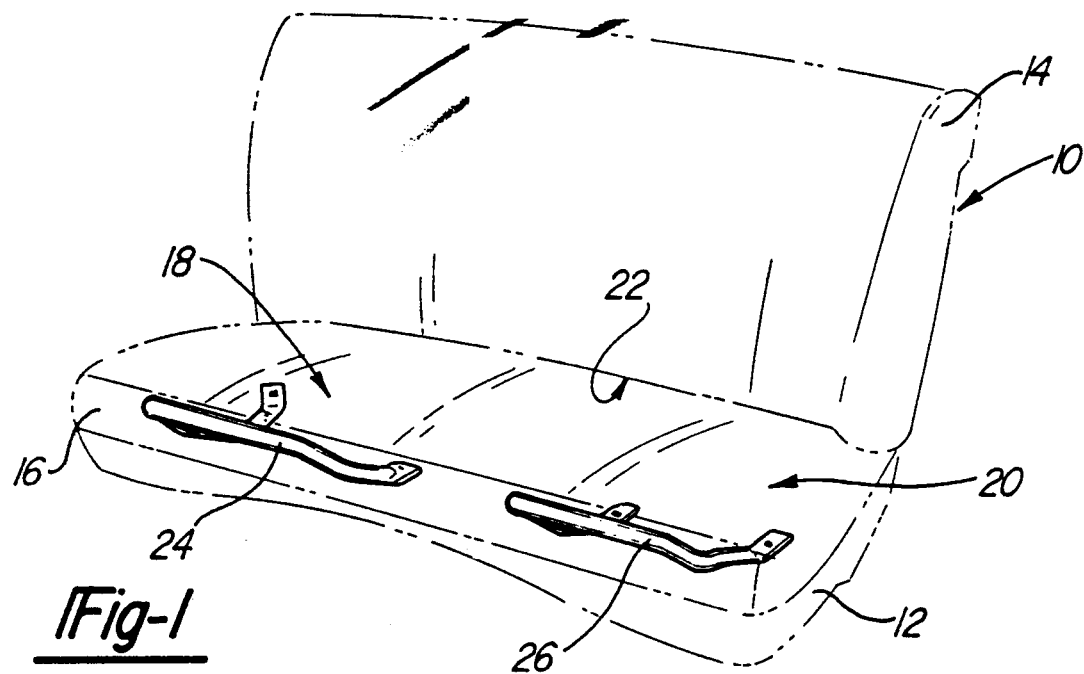
_Fig-1_
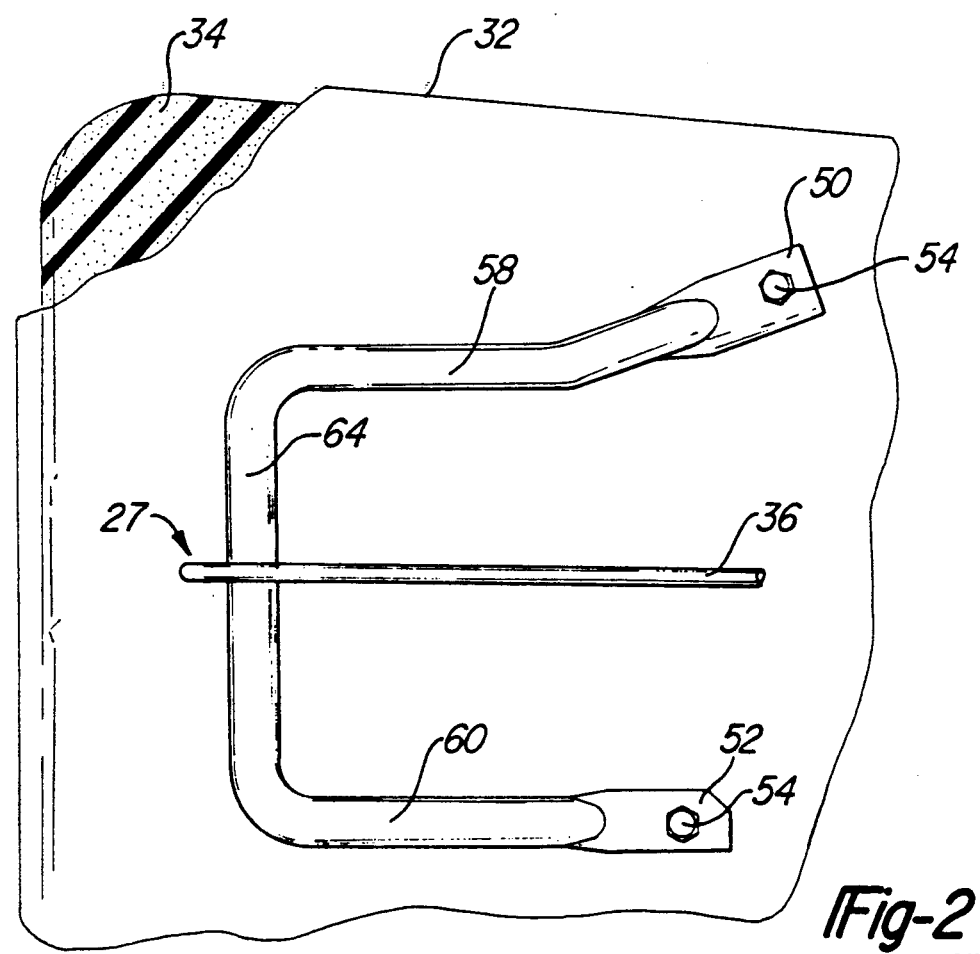
_Fig-2_

AUTOMOTIVE SEAT CUSHION SUPPORT

BACKGROUND OF THE INVENTION

The present invention relates generally to automotive seats and more specifically to a support structure for automotive seat cushions.

DESCRIPTION OF THE PRIOR ART

In crash simulation testing of automotive vehicles, it has been found that under certain loading conditions, a seated vehicle occupant restrained by both a lap belt and shoulder belt may tend to move forwardly and downwardly across the vehicle seat cushion upon the occurrence of significant frontal impact. This forward and downward movement can, in certain circumstances, result in a condition in which neither the shoulder belt nor the lap belt contacts the occupant in the most favorable location. Resisting the tendency for forward and downward movement is therefore considered desirable.

There have been attempts in the prior art to provide movable seat structures which tip the front edge of the seat cushion upwardly as the seat moves forwardly in response to frontal impact. Exemplary of such seat structure are those disclosed in U.S. Pat. No. 3,552,795 to Perkins et al, U.S. Pat. No. 4,623,192 to Koide, et al, U.S. Pat. No. 4,154,472 to Bryll and U.S. Pat. No. 4,738,485 to Rumpf. These prior art seat structures require the utilization of complex and expensive movable seat mechanisms to permit forward and rearward sliding movement of the seat to effect the tipping motion. Since forward and rearward motion of most vehicle seats, particularly those behind the frontmost seating position, is unnecessary, utilization of such mechanisms requires an expenditure of material and labor that in many applications is unwarranted. The prior art seat structures also suffer from the dynamic disadvantage that their resistance to forward and downward movement is effected only upon actuating movement of the entire seat cushion to the tipped-up position. The requisite softness of the cushion itself does not provide a significant barrier to this movement until the entire structure of the seat is positioned below the rear of the occupant's upper legs.

SUMMARY OF THE INVENTION

Responsive to the deficiencies in the prior art, it is an object of the present invention to provide an economically producible support for a seat cushion of a fixed automotive seat which is secured to the vehicle's floor below the seat cushion and which provides a restraining portion projecting obliquely from the floor toward the front upper edge of the seat cushion to provide a supporting structure beneath the upper legs of the vehicle occupant resisting the forward and downward movement.

It is a further object of the support of the present invention to provide means for securing the seat cushion against forward movement while permitting rearward movement to effect removal of the cushion from the vehicle, as is customarily permitted with respect to certain fixed automotive seats.

The support of the present invention consists generally of a U-shaped member configured in a manner allowing it to be fixedly secured to the vehicle floor and having a part extending along the surface of the floor and terminating in an obliquely extending support portion having its closed end traversing a front portion of the seat cushion beneath the occupant's legs.

The improved support further includes a hook formed on a portion of the seat cushion engageable with the support frame U-shaped member for effecting the releasable securing of the seat cushion to the support frame.

BRIEF DESCRIPTION OF THE DRAWINGS

Further features of the present invention will become apparent to those skilled in the automotive seating arts upon reading the following specification with reference accompanying drawings in which:

FIG. 1 is a perspective view of a stationary automotive seat with a support frame, the seat itself being shown in phantom and a support frame according to the present invention being illustrated mounted below the seat;

FIG. 2 is a cross-sectional view of a seat cushion showing the improved support of the present invention therewith;

DESCRIPTION OF THE PREFERRED EMBODIMENT

Figure 3:
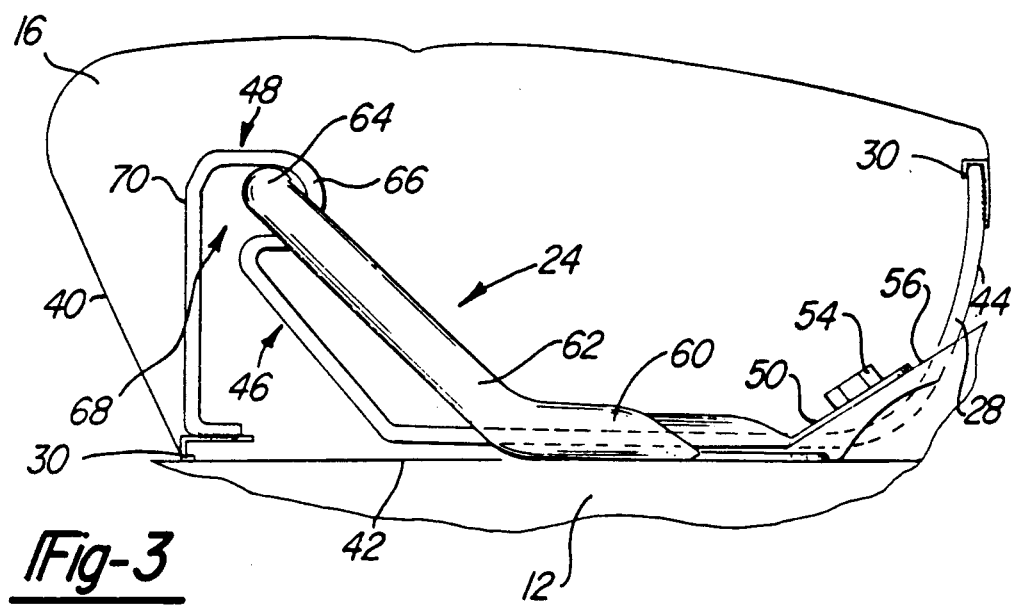
FIG. 3 is a side view of the support of FIG. 2.

Turning now to the drawings, and in particular to FIG. 1 thereof. An automotive seat 10 is illustrated as being mounted on the floor 12 of an automotive vehicle (the remainder of the vehicle not shown). The seat 10 is illustrated as including an upstanding seat back 14 extending substantially vertically from the floor 12 and a seat cushion 16 mounted on and extending generally parallel to the floor 12. The seat 10 is illustrated as including two seating positions indicated at 18 and 20 for supporting vehicle occupants. The seat 10 depicted is preferably generally of the type in which the seat back 14 is fixedly secured to the vehicle body in a known manner and the seat cushion 16 is slidingly engaged under a lower frontal edge 22 of the seat back 14. The seat cushion 16 is releasably secured to the vehicle floor to permit its removal.

A pair of seat ramps 24, 26 are illustrated as being positioned beneath the cushion 16 in vertical registration with the occupant seating positions 18, 20, respectively. The seat ramps, 24, 26, as may best be seen in FIGS. 2 and 3, comprise a portion of the support, indicated generally at 27, of the present invention.

Turning now to FIGS. 2 and 3, the seat cushion 16 is illustrated as being of the type in which a wire frame 28 bounded by a known retaining component such as the J-retainer 30 defines the shape of the seat cushion 16 and a plurality of support wires 36 (one shown) are secured to the frame 28 by welding to the J-retainer 30, and a cover 32 formed of a textile fabric or other suitable material surrounds the frame 28 and covers known cushioning material, such as indicated at 34. As may best be seen in FIG. 2, the wire frame 28 includes the plurality of support wires 36 arranged in axially running fashion. As shown in FIG. 3, the support wires 36 are formed to be arranged in parallel with the front, bottom and rear 40, 42, 44, respectively, of the seat cushion 16. To form the support 27 with the seat ramp 24 one of the support wires 36 indicated at 46 in FIG. 2 includes a forwardly positioned hook portion 48 formed to engage a portion of the seat ramps 24.

The seat ramps 24, 26 are preferably formed as generally U-shaped tubular members. As can be seen in FIG. 1, where the ramps are arranged to accommodate two laterally spaced seating positions, they are symmetrically arrayed about the vertical longitudinal plane of the seat 10. The description of the seat ramp 24 as it appears in FIGS. 2 and 3, therefore, applies essentially to the construction of the seat ramp 26. As can be seen in those drawing figures, the seat ramp 24 includes a pair of flattened ends 50, 52 for receiving conventional fasteners 54 for securing the seat ramp 24 to the vehicle floor 12. In the configuration illustrated, it will be noted that the flattened end 50 is canted at a compound angle with respect to the horizontal surface defined by the floor 12. This shaping is effected to permit a flat abutting relationship between the flatted end 50 and a canted surface 56 of the floor 12. In vehicle applications in which such a canted surface is not located in the area beneath the seats, identical straight configurations of the flatted end portions of the seat ramp 24 may be chosen. Another possible modification of the construction of the attachment of the ramps 24, 26 may include the utilization of one of the fasteners 54 that secure the ramps 24, 26 to the vehicle floor 12 to secure a portion of a seat belt assembly 57 associated with the seat 10 to the floor, as indicated in the diagrammatic representation of FIG. 5.

A pair of arms 58, 60 extend forwardly from the flatted portions 50, 52, respectively, along a horizontal plane generally parallel to the floor 12. A restraining portion 62 extends obliquely upwardly and forwardly from the arms 58, 60 and is closed by a cross member 64. As may best be seen in FIG. 3, it is the cross member 64 that is engaged by the hook portion 48 of the wire frame 28.

The hook portion 48 includes a loop portion 66 abuttingly engageable with the top, bottom and rear surfaces of cross member 64 when the seat cushion 16 is in the assembled position shown in FIG. 3. Hence, the seat cushion 16 is held fast against forward or upward movement. To remove the seat cushion 16 from the seat 10, the cushion 16 may be manually shifted rearwardly under the seat back 14 to a position in which the cross member 64 is aligned with a gap 68 formed by a depending leg 70 of the hook portion 48 as an extension of the loop portion 66. The depending leg 70 is preferably welded to the J-retainer 30 as may best be seen in FIG. 3. Further rearward axial movement of the seat cushion 16 is restrained by the depending leg 70, but pivotal upward movement of the seat cushion 66 will release the seat cushion from the cross member 64 and permit its removal.

DYNAMIC OPERATION

Figure 4:
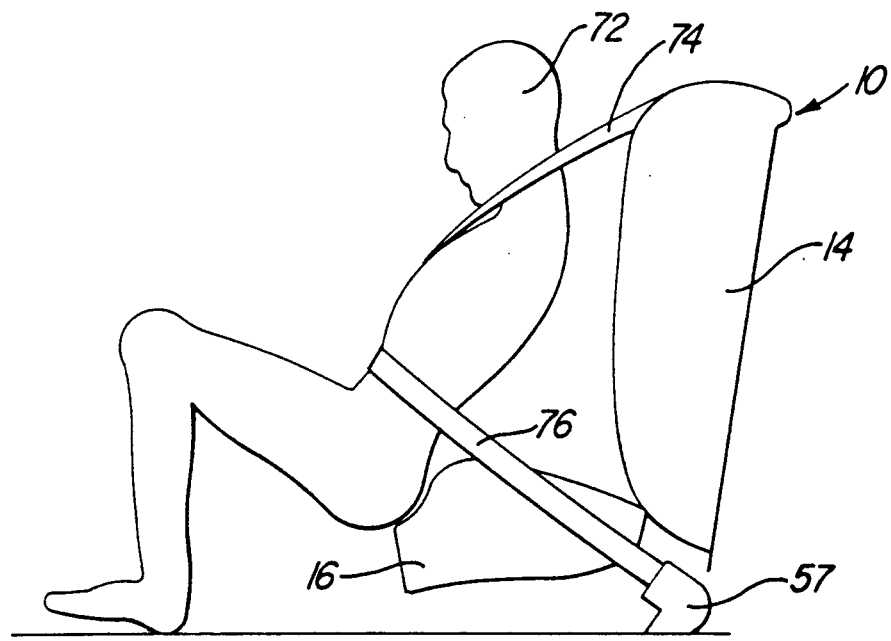
FIG. 4 is a diagrammatic view of an occupant of a fixed automotive seat upon impact responsive movement unrestrained by support of the present invention.
Figure 5:
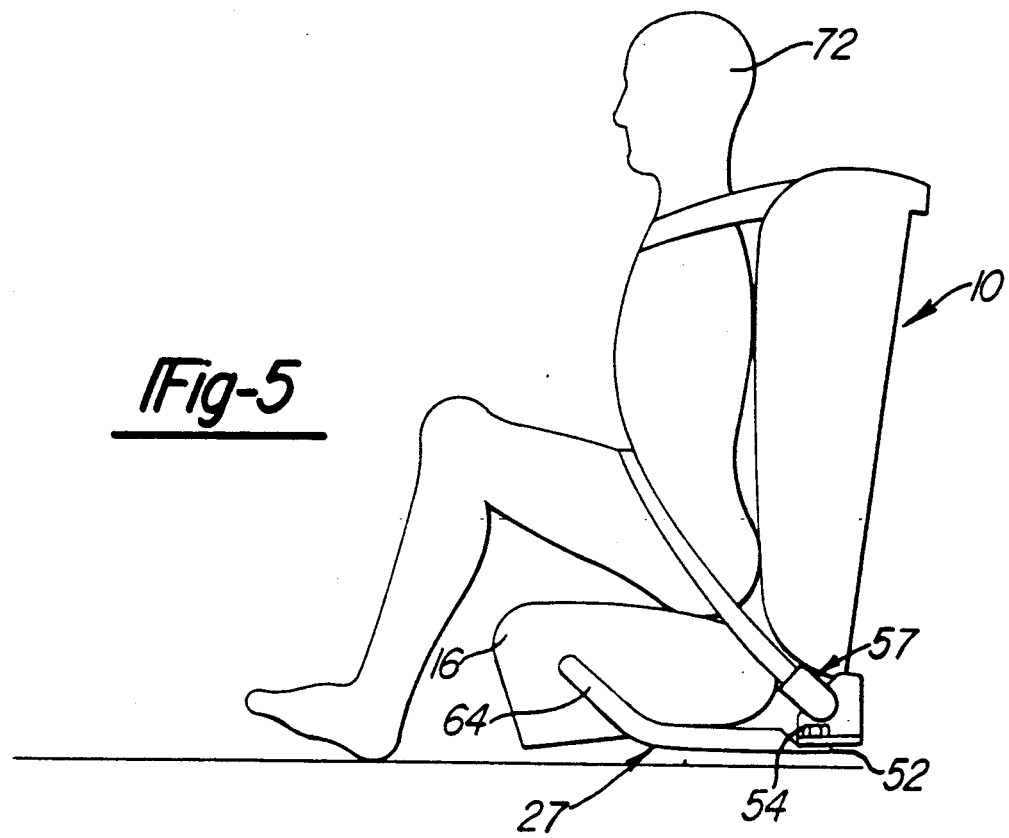
FIG. 5 is a view similar to FIG. 2 showing an occupant seated in a vehicle seat employing the support of the present invention.
Figure 6:
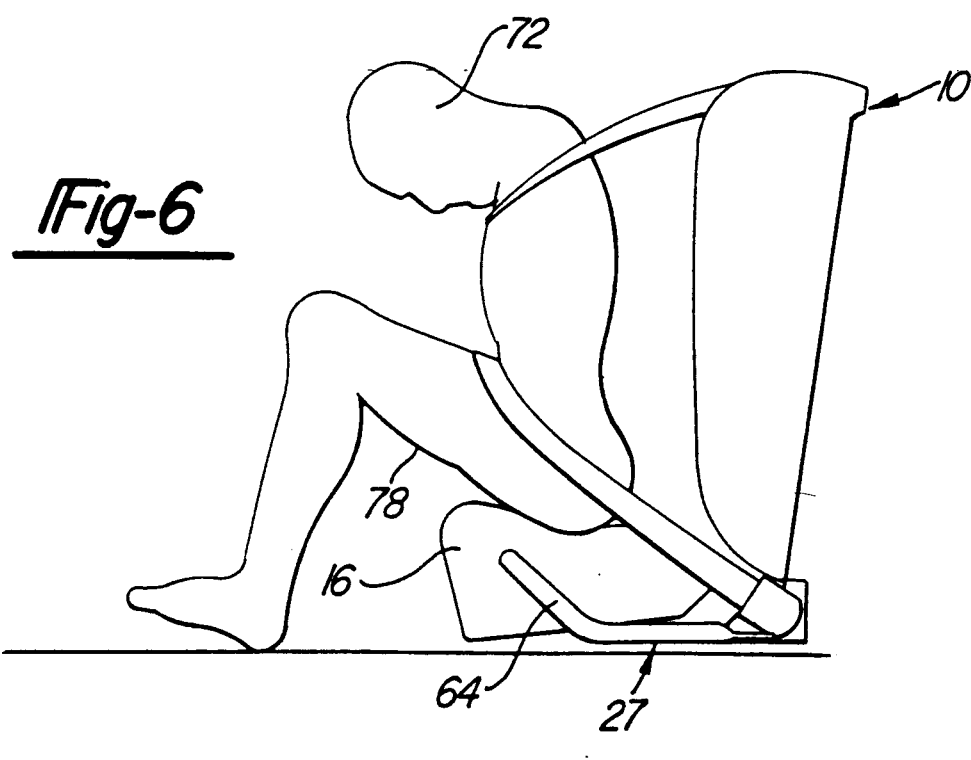
FIG. 6 shows the movement of the occupant of the seat of FIG. 5 responsive to a frontal impact.

Turning now to FIGS. 4, 5 and 6, the advantageous effect of the seat cushion support 26 of the present invention during emergency automotive vehicle operation can be appreciated. The diagrammatic representation of FIG. 4 illustrates the occurrence of an undesirable motion movement effect of a vehicle occupant 72 restrained by a seat belt mechanism 56 in a vehicle seat 10 during sudden deceleration. It can be seen that the occupant 72 may slide forwardly and downwardly with respect to the seat cushion 16 and may, in fact, change contact position of the shoulder belts 74 and the lap belt 76 of the seat belt assembly 56, with respect to his body. In FIGS. 5 and 6, however, a support 26, according to the present invention, is fastened below the seat 10 presenting a restraining portion 64 extending upwardly and forwardly below the lower leg surface 78 of the occupant 72. This positioning of the support 26 effectively resists the forward and downward movement of the occupant 72 constraining the occupant 72 to movement parallel to the plane defined by the restraining portion 64, which may be substantially parallel to the path of the lap belt 76, as may best be seen in FIG. 6. This, of course, reduces any tendency of the occupant 72 to slide with respect to the shoulder belt 74 and the lap belt 76, changing their positions of contact with respect to the body of the occupant 72.

While only one embodiment of the improved seat cushion support according to the present invention has been disclosed, others may be possible without departing from the scope of the appended claims.

We claim:

1. In an automotive vehicle body having a floor and a seat mounted on the floor having at least one seating position for supporting vehicle occupants, the seat including a seat back extending substantially perpendicularly upwardly from the floor and the seat cushion having rear surfaces abutting lower front surfaces of the seat back and extending substantially parallel to the floor, an improved support for the seat cushion comprising:

a support frame fixedly secured to the floor below the rear of the seat cushion and including a restraining portion projection obliquely upwardly and forwardly from the floor to a position rearwardly proximate the front of the seat cushion, comprising a generally U-shaped member having a substantially horizontal mounting portion including one end adapted to be fixedly secured to the floor proximate the rear of the seat cushion and wherein the restraining portion projects from the other end of the mounting portion.

2. A support as defined in claim 1, wherein the support frame is formed as a tubular member having a pair of flattened ends for engagement with the floor.

3. A support as defined in claim 1, wherein the support frame is positioned below the seating position.

4. In an automotive vehicle body having a floor and a seat mounted on the floor having at least one seating position for supporting vehicle occupants, the seat including a seat back extending substantially perpendicularly upwardly from the floor and the seat cushion having rear surfaces abutting lower front surfaces of the seat back and extending substantially parallel to the floor, an improved support for the seat cushion comprising:

a support frame fixedly secured to the floor below the seat cushion, and including a restraining portion projecting obliquely upwardly and forwardly from the floor to a position rearwardly proximate the front of the seat cushion said support frame comprising a generally U-shaped member having a mounting portion including one end adapted to be fixedly secured to the floor proximate the rear of the seat cushion and wherein the restraining portion projects from the other end of the mounting portion; and means for releasably securing the seat cushion to the support frame.

5. A support as defined in claim 4, wherein the support frame is formed as a tubular member having a pair of flattened ends for engagement with the floor.

6. A support as defined in claim 4, wherein the support frame is positioned below the seating position.

7. A support as defined in claim 4, wherein the means for releasably securing comprises a hook carried with the seat cushion proximate the front edge thereof engageable with the support frame and operative to permit longitudinal rearward movement of the seat cushion and to resist forward movement of the seat cushion in a direction parallel to the floor.

8. A support as defined in claim 4, wherein the seat cushion comprises a wire frame and the means for releasably securing comprises a hook carried with the wire frame proximate the front edge of the seat cushion engageable with the support frame and operative to permit longitudinal rearward movement of the seat cushion and to resist forward movement of the seat cushion in a direction parallel to the floor.

9. A support as defined in claim 8, wherein the hook is formed integrally with a portion of the wire frame.

10. A seat adapted to be mounted on the floor of an automotive vehicle body in forward facing relationship for supporting a vehicle occupant and comprising:
   a seat back extending substantially perpendicularly upwardly from the floor;
   a seat cushion having rear surfaces abutting lower front surfaces of the seat back and extending substantially parallel to the floor;
   a support frame fixedly secured to the floor below the seat cushion proximate said rear surfaces and including a restraining portion projecting obliquely upwardly and forwardly from the floor to a position rearwardly proximate the front of the seat cushion for resisting forward and downward movement of the occupant in response to deceleration of the vehicle during forward motion, said support frame comprising a generally U-shaped member having a substantially horizontal mounting portion including one end adapted to be fixedly secured to the floor of the vehicle proximate the rear of the seat cushion and wherein the restraining portion projects from the other end of the mounting portion.

11. A seat as defined in claim 10, wherein the support frame is formed as a tubular member having a pair of flattened ends for engagement with the floor.

12. A seat as defined in claim 10, wherein the support frame is positioned below the seating position of the occupant.

13. A seat as defined in claim 10, and further comprising a seat belt assembly including a retractor fixedly secured to the vehicle body adjacent the seat cushion and a lap belt and a shoulder belt for restraining the vehicle occupant and wherein the support frame restraining portion is positioned substantially in parallel with the path of the lap belt in its restraining relationship with the occupant.

14. A seat as defined in claim 10, and further comprising a seat belt assembly including a retractor fixedly secured to the vehicle body adjacent the seat cushion by a fastener the fastener being further operative to fixedly secure the support frame to the vehicle floor.

* * * * *